Dec. 30, 1924.
W. HORWITZ
PROCESS FOR THE RECOVERY OF PETROLEUM
Filed Feb. 27. 1920
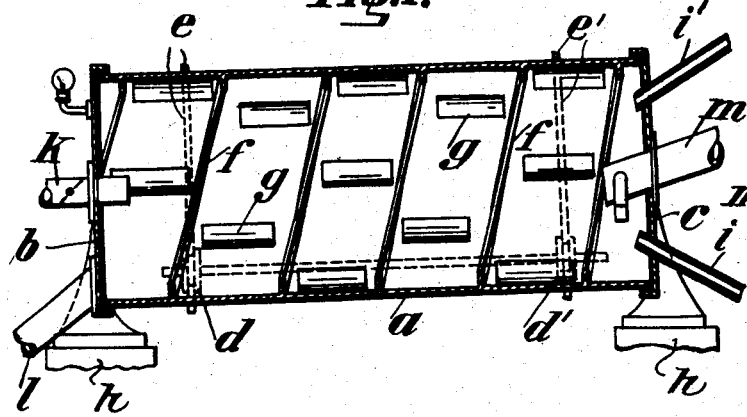
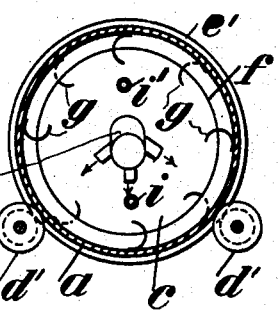
Inventor
Wilhelm Horwitz
by *[signature]*
his Attorney Patented Dec. 30, 1924.

1,520,752

UNITED STATES PATENT OFFICE.

WILHELM HORWITZ, OF BERLIN, GERMANY.

PROCESS FOR THE RECOVERY OF PETROLEUM.

Application filed February 27, 1920. Serial No. 361,681.

*To all whom it may concern:*

Be it known that I, WILHELM HORWITZ, citizen of the German Republic, residing at Berlin, Germany, have invented certain new and useful Improvements in a Process for the Recovery of Petroleum, of which the following is a specification.

This invention relates to the recovery of petroleum from oleiferous sand and other oleiferous mineral strata. The petroleum occurring in nature is bound to more or less porous mineral strata which differ greatly in geological formation and which are more or less saturated with said oil. Efforts have been made to obtain the petroleum contained in such strata in a chemical way, viz. by extracting it by fat dissolving means. In contradistinction to that method, the recovery of petroleum from the oleiferous sand and oleiferous mineral strata, is effected mechanically, according to my proved method, by boiling such sand or mineral with water under pressure. By this means, the bitumen contained in the sand or the mineral and which mechanically holds the oil is softened, whereby the oil is liberated. According to my invention the single grains of the sand or mineral are promiscuously mixed by shaking, and rubbed against each other, so as to cause the freed oil to ascend by reason of its low specific gravity and to float upon the water from which it may then be drawn off.

The boiling of the sand or mineral with water under pressure must be effected, of course, in a closed vessel, the mixture being thoroughly stirred or shaken during the boiling operation by appropriate means so as to make the particles rub against each other. Stirring the mixture may be effected also by lateral or tangential jets of water admitted to the vessel. Boiling the mixture of the water with the sand or mineral may be effected by steam under pressure which is introduced in an oblique direction, or tangentially, in jets, into the vessel and into and against the mixture rotating in the same, whereby the particles of the mixture, are most thoroughly mixed with each other. Or the steam under pressure is introduced into the vessel in a plurality of obliquely directed jets, through nozzles. Other ways of admitting the steam to the vessel for the purpose in view are obvious to those skilled in this art and need not be stated at length.

Means to assist in extracting and dissolving the oil may be added to the water or to the steam or to both fluids; such means are, for instance, benzol, toluol, sodium-chloride, sulphate of sodium, and similar salts, all of which are equivalents for the purpose.

It is obvious that the process may be carried out intermittently or continuously. In the former case, the boiling is interrupted after a suitably long action of the heat, the mass is allowed to settle, and the oil floating upon the water is drawn off. In the latter case, an emulsion of the sand or granulated mineral under treatment, or to be treated, is continuously introduced into the vessel, under pressure, and from the mixture of sand or mineral and water and oil already contained in the vessel, a suitable quantity is allowed to run off through a valve so as to maintain the pressure existing in the vessel.

By relieving the hot water from the pressure large quantities of steam are developed which either must be condensed or may be utilized in any manner. The hot water may be used, if desired, for pre-heating the mixture that is to be introduced into the vessel to be treated therein.

The vessel for carrying out the process is preferably a somewhat inclined drum with hollow pivots or trunnions by means of which the mixture is introduced into and discharged from the drum. One (the lower) or both pivots or trunnions may extend into the drum and may be closed at its end (or their ends) and may have oblique lateral apertures through which the mixture escapes in jets.

The above described process may be practiced with the aid of one of the forms of apparatus shown in the accompanying drawing, wherein—

Fig. 1 is a diagrammatic side view, partly in section, of a revolving drum,

Fig. 2 is a cross-section thereof.

In Fig. 1 $a$ is a drum preferably inclined. The two ends $b$ and $c$ of the drum are fixed, while the body $a$ may be revolved by means of rollers $d$, $d'$ driven by suitable gearing $e$, $e'$. Within the drum helical ribs $f$, $f$ are provided. The inner periphery of the drum has scoop-shaped members $g$, $g$ secured thereto. The ends of the drum are supported by pillars $h$, $h$. Steam is introduced into the drum through pipes $i$, $i'$.

The oil and sand mixed with water is fed into the drum by a pipe $m$, the mixture being divided into a plurality of streams.

Steam under high pressure is fed to the drum, which revolves at a speed of about 20 revolutions per minute. The sand comes into intimate contact with the steam, while by the revolution of the drum the sand is thoroughly agitated and the grains of the sand are caused to rub against each other. The scoops $g$ lift the grains that have fallen to the bottom continually upwards, so that the steam can thoroughly act on the sand, while the oil adhering to the sand is set free and by the action of the steam mixes with the water present. The sand is gradually conveyed to the exit end $b$ by the revolution of the drum $a$ and the helical ribs $f, f$. The outlet pipe $k$ for the steam is throttled so that the steam pressure is always maintained within the drum. From time to time the exhausted sand with the water and the oil separated out are drawn off through the pipe $l$ and allowed to settle in separate tanks, where the oil floats to the top and may be drawn off to any suitable collecting tank.

Having now described my invention, what I desire to secure by a patent of the United States is:

The herein described method for the recovery of petroleum from oleiferous sand and other oleiferous minerals, consisting in boiling the oleiferous substance with water under pressure, and simultaneously stirring the mixture by jets of hot water under pressure introduced tangentially into said mixture.

In testimony whereof I affix my signature.

WILHELM HORWITZ.